(12) United States Patent
Sankar et al.

(10) Patent No.: US 10,706,058 B2
(45) Date of Patent: Jul. 7, 2020

(54) RANKING LOCATION QUERY RESULTS BASED ON SOCIAL NETWORKING DATA

(71) Applicant: Facebook, Inc., Menlo Park, CA (US)

(72) Inventors: Sriram Sankar, Palo Alto, CA (US); Srinivas P. Narayanan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 604 days.

(21) Appl. No.: 14/988,604

(22) Filed: Jan. 5, 2016

(65) Prior Publication Data

US 2016/0132508 A1 May 12, 2016

Related U.S. Application Data

(63) Continuation of application No. 13/544,314, filed on Jul. 9, 2012, now Pat. No. 9,262,540.

(51) Int. Cl.
| | |
|---|---|
| *G06F 15/16* | (2006.01) |
| *G06F 16/2457* | (2019.01) |
| *G06F 16/29* | (2019.01) |
| *G06F 16/9535* | (2019.01) |
| *G06F 16/9537* | (2019.01) |
| *G06Q 50/00* | (2012.01) |
| *G06Q 10/10* | (2012.01) |
| *H04L 29/08* | (2006.01) |

(52) U.S. Cl.
CPC ........ *G06F 16/24578* (2019.01); *G06F 16/29* (2019.01); *G06F 16/9535* (2019.01); *G06F 16/9537* (2019.01); *G06Q 10/10* (2013.01); *G06Q 50/01* (2013.01); *H04L 67/18* (2013.01); *H04L 67/306* (2013.01)

(58) Field of Classification Search
CPC ........ G06Q 50/01; G06Q 10/10; H04L 67/18; G10L 15/06; G06F 17/30
See application file for complete search history.

(56) References Cited

U.S. PATENT DOCUMENTS

| 8,370,062 | B1 * | 2/2013 | Starenky | H04W 4/025 |
| | | | | 701/467 |
| 2008/0070593 | A1 * | 3/2008 | Altman | H04W 4/029 |
| | | | | 455/457 |
| 2010/0076968 | A1 * | 3/2010 | Boyns | H04W 4/21 |
| | | | | 707/732 |
| 2011/0041076 | A1 * | 2/2011 | Sinn | G06Q 30/02 |
| | | | | 715/745 |

(Continued)

*Primary Examiner* — Kevin T Bates
*Assistant Examiner* — Mark A Scott
(74) *Attorney, Agent, or Firm* — Fenwick & West LLP

(57) ABSTRACT

A location query engine in a social networking system provides users with a subset of candidate locations based on location query received from a user. The social networking system identifies candidate locations from stored location data that has one or more attributes matching at least one attribute of the location query. The candidate locations are ranked based on social data determined from a user profile associated with the user, and the subset of candidate locations is selected from the ranking and provided to the user. Examples of social data used for ranking the candidate locations include locations associated with other users connected to the user, locations associated with objects connected to the user and locations previously associated with the user.

21 Claims, 3 Drawing Sheets

(56) References Cited

U.S. PATENT DOCUMENTS

| | | | | |
|---|---|---|---|---|
| 2011/0196935 A1* | 8/2011 | Rideout | H04W 4/21 | 709/206 |
| 2011/0225250 A1* | 9/2011 | Cypes | G06Q 10/107 | 709/206 |
| 2011/0238762 A1* | 9/2011 | Soni | G01C 21/3679 | 709/206 |
| 2011/0307307 A1* | 12/2011 | Benmbarek | G06Q 30/0241 | 705/14.4 |
| 2011/0313657 A1* | 12/2011 | Myllymaki | G01C 21/3682 | 701/438 |
| 2012/0046049 A1* | 2/2012 | Curtis | H04W 4/025 | 455/456.3 |
| 2012/0047129 A1* | 2/2012 | Redstone | G06F 17/3087 | 707/723 |
| 2012/0047147 A1* | 2/2012 | Redstone | G06F 17/3087 | 707/748 |
| 2012/0166452 A1* | 6/2012 | Tseng | G06F 17/30867 | 707/749 |
| 2012/0221687 A1* | 8/2012 | Hunter | G06F 16/435 | 709/219 |
| 2012/0278395 A1* | 11/2012 | Garcia | G06Q 10/00 | 709/205 |
| 2012/0317198 A1* | 12/2012 | Patton | G06Q 10/10 | 709/204 |
| 2013/0054698 A1* | 2/2013 | Lee | G06Q 30/0259 | 709/204 |
| 2013/0095857 A1* | 4/2013 | Garcia | H04W 4/02 | 455/456.3 |
| 2013/0097162 A1* | 4/2013 | Corcoran | G06F 16/29 | 707/724 |
| 2013/0097246 A1* | 4/2013 | Zifroni | G06Q 50/01 | 709/204 |
| 2013/0124626 A1* | 5/2013 | Cathcart | G06Q 10/10 | 709/204 |
| 2013/0166580 A1* | 6/2013 | Maharajh | H04L 65/605 | 707/758 |
| 2013/0226937 A1* | 8/2013 | Moritz | G06Q 30/0282 | 707/748 |
| 2013/0268511 A1* | 10/2013 | Bailey | G06F 17/30899 | 707/722 |
| 2013/0268886 A1* | 10/2013 | Sureshkumar | G06Q 10/025 | 715/810 |
| 2013/0304708 A1* | 11/2013 | Ritchie | G06Q 30/02 | 707/687 |
| 2013/0325964 A1* | 12/2013 | Berberat | H04L 67/18 | 709/204 |
| 2015/0127628 A1* | 5/2015 | Rathod | H04W 4/21 | 707/710 |
| 2016/0132508 A1* | 5/2016 | Sankar | G06Q 50/01 | 707/724 |

* cited by examiner

RANKING LOCATION QUERY RESULTS BASED ON SOCIAL NETWORKING DATA

CROSS-REFERENCE TO RELATED APPLICATIONS

This application is a continuation of U.S. application Ser. No. 13/544,314, filed Jul. 9, 2012 and now allowed, which is incorporated herein by reference in its entirety.

BACKGROUND

The disclosure generally relates to social networking, and more specifically to associating a location with social networking content.

Social networking systems have become prevalent in recent years because they provide a useful environment in which users can connect to and communicate with other users. A variety of different types of social networking systems exist that provide mechanisms allowing users to interact within their social networks. In this context, a user may be an individual or any other entity, such as a business or other non-person entity. Accordingly, while enabling social communications among friends, a social networking system can also be a valuable tool for businesses to engage with potential consumers.

Additionally, social networking systems enable users to interact with other users or objects by performing various actions. For example, users may post comments to pages associated with other users, view images, view video, listen to audio data or perform other actions on various objects maintained by the social networking system. Associating a location with user content posted to the social networking system improves interactions between social networking system users. For example, associating a location with a status update or photograph provides additional context about the status update or photograph to other users. However, allowing users to freely label content with a user-defined tag may create inconsistencies between various content. For example, different users may use different names to identify the same location, making it difficult for users to correlate content with locations.

However, many locations have similar or identical names, which may require users to identify a location from a list of multiple possible locations from the location query engine. For example, if a user attempts to associate a picture with a name or identifier having multiple locations, such as a chain restaurant, a location query engine may return a listing of various chain restaurant locations, causing the user to navigate through several options and to know additional information about, such as its current location. While some devices, such as smartphones, include a global positioning system (GPS) to identify a location, users may desire to associate content with a location different than their current location or may provide content to the social networking system from a device that does not include a GPS.

SUMMARY

A social networking system receives a location query from a user. For example, when providing a post to the social networking system, the user may enter a location associated with the post using a location query. The location query may include text (e.g., an entire search term or one or more characters for prefix-matching with a location) entered by the user and communicated to the social networking system. By comparing the location query to stored locations, the social networking system identifies candidate locations, which have one or more attributes matching attributes of the location query. For example, candidate locations include stored locations having a name with a portion of the name matching at least a portion of the location query. One or more factors are used to rank the candidate locations, with a set of candidate locations selected by the social networking system for presentation to a user. For example, the selected set of candidate locations is displayed as a list to the user, allowing a user to specify a location by accessing a candidate location shown in the list.

Various factors may be used to rank the candidate locations. For example, a location associated with the user, as well as a distance between the location associated with the user and the candidate locations may be used for ranking. The location associated with the user may be a location specified in a profile associated with the user or a location determined from a current location of a device associated with the user. The candidate locations may be ranked so that candidate locations closer to the location associated with the user have a higher ranking. As another example, data from other social networking system users may be used in ranking the candidate locations. Locations associated with other social networking system users connected to the user, the popularity of candidate locations to other social networking system users, either connected to the user or unconnected to the user, or other information about candidate locations may be used to influence the candidate location ranking. Other factors, such as time of day, day of the week or other suitable data may also be used when ranking the candidate locations. This increases the likelihood that the candidate advertisements most relevant to the user have a high ranking in the list.

When selecting candidate locations for inclusion in the list, the social networking system may use attributes of the candidate advertisements. In some embodiments, the candidate locations may have different types, such as a city, a check-in associated with the user, a historical location of the user, a location geographically near a location associated with the user (a "geographically near location"), or a business, and various types of candidate locations are selected for inclusion in the list. For example, the social networking system selects at least one candidate location having a city type, at least on candidate location having a check-in type and at least one candidate location having a geographically near type for the list, so that the list is populated with diverse types of candidate locations. This provides a user with a wider range of options for selecting a location associated with content.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
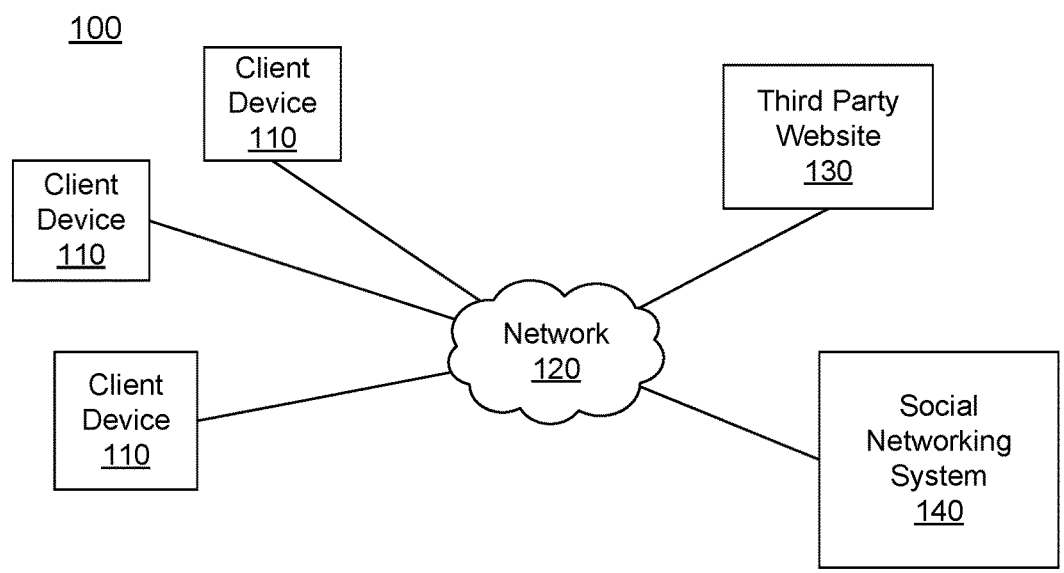
FIG. 1 is a block diagram of a system architecture for providing content items to users of a social networking system, in accordance with an embodiment of the invention.

FIG. 1 is a high level block diagram illustrating a system environment 100 of a social networking system 140. The system environment 100 comprises one or more client devices 110, a network 120, one or more third-party websites 130 and the social networking system 140. In alternative configurations, different and/or additional components may be included in the system environment 100. The embodiments described herein can be adapted to online systems that are not social networking systems.

The client devices 110 comprise one or more computing devices capable of receiving user input as well as transmitting and/or receiving data via the network 140. For example, the client devices 110 may be desktop computers, laptop computers, smartphones, personal digital assistants (PDAs) or any other device including computing functionality and data communication capabilities. A client device 110 is configured to communicate via the network 120, which may comprise any combination of local area and/or wide area networks, using both wired and wireless communication systems. In one embodiment, a client device 110 executes an application allowing a user of the client device 110 to interact with the social networking system 140. For example, a client device 110 executes a browser application to enable interaction between the client device 110 and the social networking system 140 via the network 120.

In some embodiments, a client device 110 also has location determination capabilities for determining a geographic location where the client device 110 is located. For example, a client device 110 includes a global positioning system (GPS) or other suitable system for determining a location for the client device 110. The client device 110 may communicate its location information to the social networking system 140 or to a third-party website 130 subject to privacy settings specified by a user of the client device 110. The privacy settings allow a user to limit distribution of the client device location to entities identified by the user or allow a user to specify a subset the client device locations (e.g., locations that the user approves for communicating to an entity) to other entities via the network 120.

The client devices 110 are configured to communicate with each other, with the third-party website 130 and/or with the social networking system 140 via the network 120, which may comprise any combination of local area and/or wide area networks, using both wired and wireless communication systems. In one embodiment, the network 120 uses standard communications technologies and/or protocols. Thus, the network 120 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 130, or multiple third-party websites 130, may be coupled to the network 120 for communicating with the social networking system 140, which is further described below in conjunction with FIG. 2.

Figure 2:
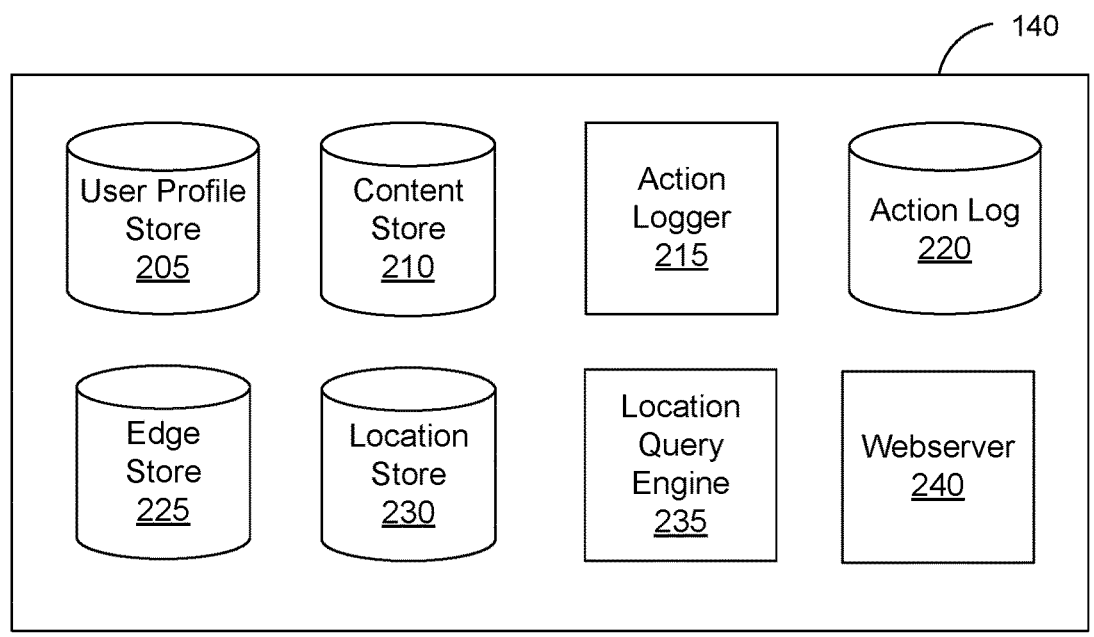
FIG. 2 is a block diagram of a social networking system, in accordance with an embodiment of the invention.

FIG. 2 is a block diagram of an embodiment of a social networking system 140. In the embodiment shown by FIG. 2, the social networking system 140 includes a user profile store 205, a content store 210, an action logger 215, an action log 220, an edge store 225, a location store 230, a location query engine 235 and a web server 240. In other embodiments, the social networking system 140 may include additional, fewer, or different modules for various applications. Conventional components such as network interfaces, security functions, load balancers, failover servers, management and network operations consoles, and the like are not shown so as to not obscure the details of the system architecture.

Each user of the social networking system 240 is associated with a user profile, which is stored in the user profile store 205. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 205 describes the users of the social networking system 140, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on objects in the object store 210 and stored in the action log 120.

A user profile may also include location information associated with a user. For example, the user profile includes data identifying a user's hometown or a user's current city. The location information may be provided by the user, or may be obtained from a client device 110 associated with a user subject to one or privacy settings specified by the user. Additionally, the user profile may include other locations associated with a user, such as locations from which the user previously checked-in to the social networking system 140 or other locations previously associated with the user. In one embodiment, the location information or a subset of the location information is stored in the location store 230, further described below.

The content database 210 stores content objects. A content object may include any type of object on the social networking system 140, such as a page post, a status update, a photo, a video, a link, a shared content item, a gaming application achievement, a check-in event at a local business and so on. Content objects include objects created by users of the social networking system 140, such as status updates that may be associated with photo objects, location objects, and other users, photos tagged by users to be associated with other objects in the social networking system 140, such as events, pages, and other users, and applications installed on the social networking system 140. In some embodiments, the content objects are received from third-party applications or third-party applications separate from the social networking system 140. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact within the social networking system 140.

The action logger 215 receives communications about user actions on and/or off the social networking system 140. The action logger 215 populates the action log 220 with information about user actions, allowing the actions to be tracked. Example actions include: adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well. These actions are stored in the action log 220.

The action log 220 may be used by the social networking system 140 to track users' actions on the social networking system 140 as well as external websites that communicate information back to the social networking system 140, such as the third party website 130. Users may interact with various objects on the social networking system 140, including commenting on posts, sharing links, and checking-in to physical locations via a mobile device, accessing content items in a sequence or other interactions. Information describing these actions is stored in the action log 220. Additional examples of interactions with objects on the social networking system 140 included in the action log 220 include commenting on a photo album, communications between users, becoming a fan of a musician, adding an event to a calendar, joining a groups, becoming a fan of a brand page, creating an event, authorizing an application, using an application and engaging in a transaction. Additionally, the action log 220 records a user's interactions with advertisements on the social networking system 140, interactions with content items, as well as interactions with applications operating on the social networking system 140.

The action log 220 may also include user actions on external web sites, such as third-party website 130. For example, the action logger 215 receives data describing a user's interaction with a third-party website 120, which is stored in the action log 220. Examples of actions where a user interacts with a third-party website 130 includes a user expressing an interest in a third-party website 130 or another entity, a user posting a comment to the social networking system 140 that discusses a third-party website 120, or a web page 122 within the third-party website 130, a user posting to the social networking system 140 a Uniform Resource Locator (URL) or other identifier associated with a third-party website 130, a user attending an event associated with a third-party website 130 or any other action by a user that is related to a third-party website 130. For example, an e-commerce website that primarily sells luxury shoes at bargain prices may recognize a user of a social networking system 140 through social plug-ins that enable the e-commerce website to identify the user of the social networking system. Because users of the social networking system 140 are uniquely identifiable, e-commerce websites, such as this luxury shoe reseller, may use the information about these users as they visit their websites. The action log 220 records data about these users, including viewing histories, advertisements that were clicked on, purchasing activity, and buying patterns. Hence, interactions between a social networking system user and a third-party website 130 may also be stored in the action log 220.

The edge store 225 stores the information describing connections between users and other objects on the social networking system 140 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other social networking system users and commenting on posts made by other users of the social networking system. The edge store 225 stores edge objects that include information about the edge, such as affinity scores for objects, interests, and other users. Affinity scores may be computed by the social networking system 140 over time to approximate a user's affinity for an object, interest, and other users in the social networking system 140 based on the actions performed by the user. Example embodiments of computing affinity scores are described in a related application, "Contextually Relevant Affinity Prediction in a Social Networking System," U.S. patent application Ser. No. 12/978,265, filed on Dec. 23, 2010, which is hereby incorporated by reference in its entirety. Multiple interactions between a user and a specific object may be stored in one edge object in the edge store 225, in one embodiment. In some embodiments, connections between users and objects may be stored in the content store 210 or in the user profile store 205.

The location store 230 stores location information received from client devices 110 associated with users. The location information may be obtained directly from user devices 110, e.g., at the time a notification is to be sent or at various predetermined time intervals, or the location information may be a last stored location received from the user device 110. In addition, the location store 255 may receive updated location information, e.g., in response to a change in the location of a user device 110. The location information may also be obtained from a user profile. For example, the location store 230 retrieves hometown or current city information associated with a user from a user profile. Additionally, location information in the location store 230 may be associated with, or mapped to, an object. For example, a restaurant address may be associated with a page in the social networking system 130 for the restaurant.

The location information may be stored as latitude and longitude coordinates describing a physical location or may be stored as semantic locations including a description of the location. The location store 230 may associate a semantic location with a physical location. For example a semantic location identifying a restaurant name is associated with a latitude and longitude identifying the physical location of the restaurant. Location data in the location store 230 may include one or more names, or other semantic labels associated with latitude and longitude, an address or other information specifying a physical location, with a unique location identifier associated with different location data. In some embodiments, a type is associated with stored locations, providing additional context or describing the location data. For example, types identify location data as a city, a check-in by a user, a historical location associated with a user, a location within a specified distance of a current location or other suitable data describing a location.

The location query engine 235 receives a location query from a client device 110 and compares the location query to location data in the location store 230. The location query includes data describing a location, which is compared to the stored location data to identify one or more stored locations matching, or associated with, the location query. To identify location data matching the location query, one or more attributes of the location query are compared to attributes of the stored location data, with candidate locations identified as stored location data having one or more attributes matching attributes of the location query identified as candidate locations. For example, location data associated with a name matching at least a subset of the location query is identified as a candidate location. In one embodiment, the location query engine 325 performs a case-insensitive prefix search comparing the location query with prefixes of various portions the location data, such as a name associated with the location data. Other attributes, such as a distance between the stored location data and a current location associated with the user from which the location query was received or any other attribute of location data may be used to identify candidate locations from the location store 230.

The location query engine 235 ranks the candidate locations based on one or more factors to identify the candidate locations most likely corresponding to the location query. In one embodiment, the candidate locations are ranked based on a distance between the physical location of a candidate location and the current physical location associated with the user providing the location query so candidate locations nearer to the user's current physical location are ranked higher. Additional information from the social networking system 130 may be used in addition to, or as an alternative to, ranking candidate locations by distance. For example, a variety of social signals accounting for locations associated with other users connected to the user providing the location query, locations associated with objects connected to the user providing the location query, locations previously associated with the user providing the location query, a frequency of interaction with a location by users of the social networking system 130 (e.g., users connected to the user from which the location query was received or any users of the social networking system 130) or other suitable data describing interactions between social networking system users and locations may be used when ranking candidate locations. Data for determining the social signals is retrieved from one or more of the user profile store 205, the content store 210, the action log 220 and/or the edge store 225.

The location query engine 325 may also use additional data when ranking candidate locations. For example, if the user providing the location query is moving, the rate and direction in which the user is moving may be obtained from the user's client device 110 and used when ranking. Additionally, locations associated with photographs in which the user was tagged or photographs that the user uploaded to the social networking system 130 may be used when ranking.

Using the ranking of candidate locations, the location query engine 325 selects a subset of candidate locations that are presented to the user via the client device 110. For example, a specified number of candidate locations having the highest rankings are selected and presented to the user. Alternatively, candidate locations having a ranking equaling or exceeding a threshold value are selected for presentation to the user. In some embodiments, the location query engine 325 applies one or more rules when selecting the subset. For example, the location query engine 325 selects locations having different types for inclusion in the subset, so that the subset includes more than one type of location. As an example, the subset may be selected so that at least one location having a type of city, at least one location having a type of check-in and at least one location having a type of a location previously associated with the user are included. Hence, rules may be used to by the location query engine 325 so that the subset presents the user with diverse types of locations. The location query module is further described below in conjunction with FIG. 3.

The web server 240 links the social networking system 140 via the network 120 to the one or more client devices 110, as well as to the one or more third party websites 130. The web server 240 serves web pages, as well as other web-related content, such as JAVA®, FLASH®, XML and so forth. The web server 240 may provide the functionality of receiving and routing messages between the social networking system 140 and a client device 110, for example, instant messages, queued messages (e.g., email), text and SMS (short message service) messages, or messages sent using any other suitable messaging technique. A user may send a request to the web server 240 to upload information, for example, images or videos that are stored in the content store 210. Additionally, the web server 240 may provide API functionality to send data directly to native user device operating systems, such as iOS®, ANDROID™, webOS® or a similar embedded operating system.

Generating Location Query Results Using Social Network Data

Figure 3:
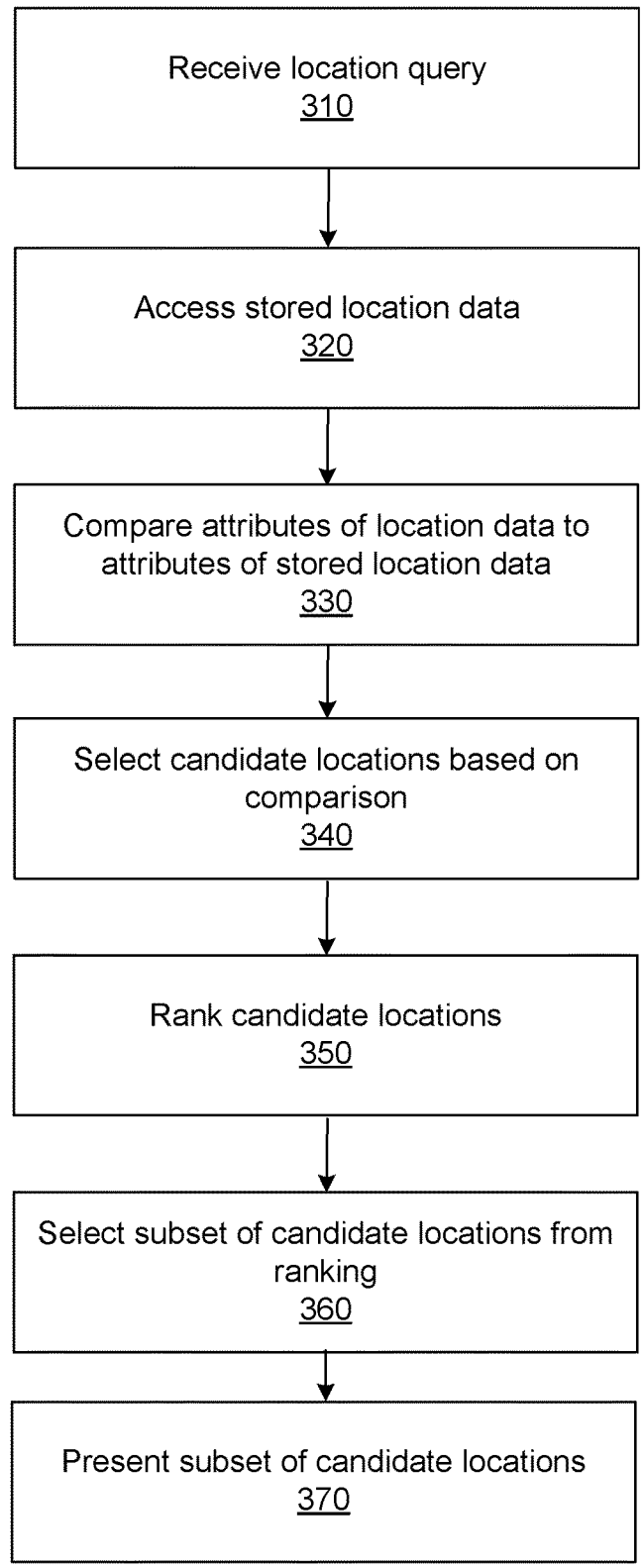
FIG. 3 is a flow chart of a method for providing location data based on social data, in accordance with an embodiment of the invention.

FIG. 3 shows a flow chart of a method 300 for providing locations to a social networking system user. A location query engine 235 receives 310 a location query from a user of a client device 110. In one embodiment, the location query is alphanumeric or textual data. The location query has one or more attributes, which may be included in the location query or derived from the location query. For example, the location query has a name attribute that is the alphanumeric or textual data received 310 from the user.

Responsive to receiving 310 the location query, the location query engine 235 accesses 320 location data stored in the location store 230. As described above in conjunction with FIG. 2, the location store 230 includes location information associated with users or objects of the social networking system 140. The location information in the location store 230 has one or more attributes, and the location query engine 235 compares 330 attributes of the location query to attributes of the stored location data. One or more candidate locations having at least one attribute matching an attribute of the location query are selected 340 from location data in the location store 235. For example, a name attribute of the location query is compared 330 to name attributes of the stored location data, and stored location data with at least a subset of its name attribute matching the name attribute of the location query is selected 340 as a candidate location.

The location query engine 120 ranks 350 the candidate locations based on data from a user profile associated with the user by the social networking system. A variety of factors may be used to perform the ranking. For example, candidate locations are ranked 350 based on a distance between the physical location of a candidate location and a location associated with the user providing the location query so candidate locations nearer to the user's current physical location are ranked higher. The location associated with the user may be retrieved from a user profile associated with the user, such as the user's current location or the user's hometown. Information from the object store 210, action log 220 and/or edge store 225 may be used as factors in the ranking, these "social signals" allow the ranking to account for information about the user stored maintained by the social networking system 130. For example, a candidate location may be ranked higher if at least a subset of its associated information matches data in the user's profile (e.g., a city, a location type, a street name or other information). The time when location information was stored to the location store 230 or to the user profile store 205 may also be used when ranking, so a candidate location associated with a subset of information matching a location more recently associated with the user has a higher ranking.

Additional examples of social signals for use in ranking candidate locations include locations associated with other users connected to the user providing the location query, locations associated with objects connected to the user providing the location query, locations previously associated with the user providing the location query, a frequency of interaction with a location by users of the social networking system 130 (e.g., users connected to the user from which the location query was received or any users of the social networking system 130) or other suitable data associating locations with social networking system users. Other suitable social signals include locations associated with photographs or other content in which the user is tagged, locations associated with pages or other objects in which a user expresses interest. The location query engine 325 may also use additional data when ranking 350 candidate locations. For example, if the user providing the location query is moving, the rate and direction in which the user is moving may be obtained from the user's client device 110 and used when ranking 350.

A subset of candidate locations are selected 360 from the ranking and presented 370 to the user. For example, a specified number of candidate locations having the highest rankings are selected 360 and presented 370 to the user. Alternatively, candidate locations having a ranking equaling or exceeding a threshold value are selected 360 for presentation to the user. In some embodiments, the location query engine 235 applies one or more rules when selecting 360 the subset. For example, the location query engine 235 selects 360 locations having different types for inclusion in the subset, so that the subset includes more than one type of location. As an example, the subset may be selected so that at least one location having a type of city, at least one location having a type of check-in and at least one location having a type of a location previously associated with the user are included. The user selects a candidate location from the list, which is communicated to the social networking system 130 and associated with the user or with content from the user.

As another example of application of rules when selecting 360 the subset of locations, the location query module 235 generates groups of candidate locations based on the distance from the candidate locations to a location associated with the user, such as a current location identified by the user's user profile; however, in other examples, the candidate locations may be grouped using any suitable attribute, such as type associated with the candidate locations. For example, a first group includes candidate locations within a first range of distances from the user's current location, a second group includes candidate locations within a second range of distances from the current location, etc. The location query module 235 may select a set of candidate locations from each group and rank 350 the candidate locations within the different groups based on social signals and/or additional data, as described above. One or more candidate locations are selected 360 from the different groups for inclusion in the list presented 370 to the user. An example of grouping candidate locations for selection is further described below in conjunction with FIG. 4.

Example Process for Selecting Candidate Locations

Figure 4:
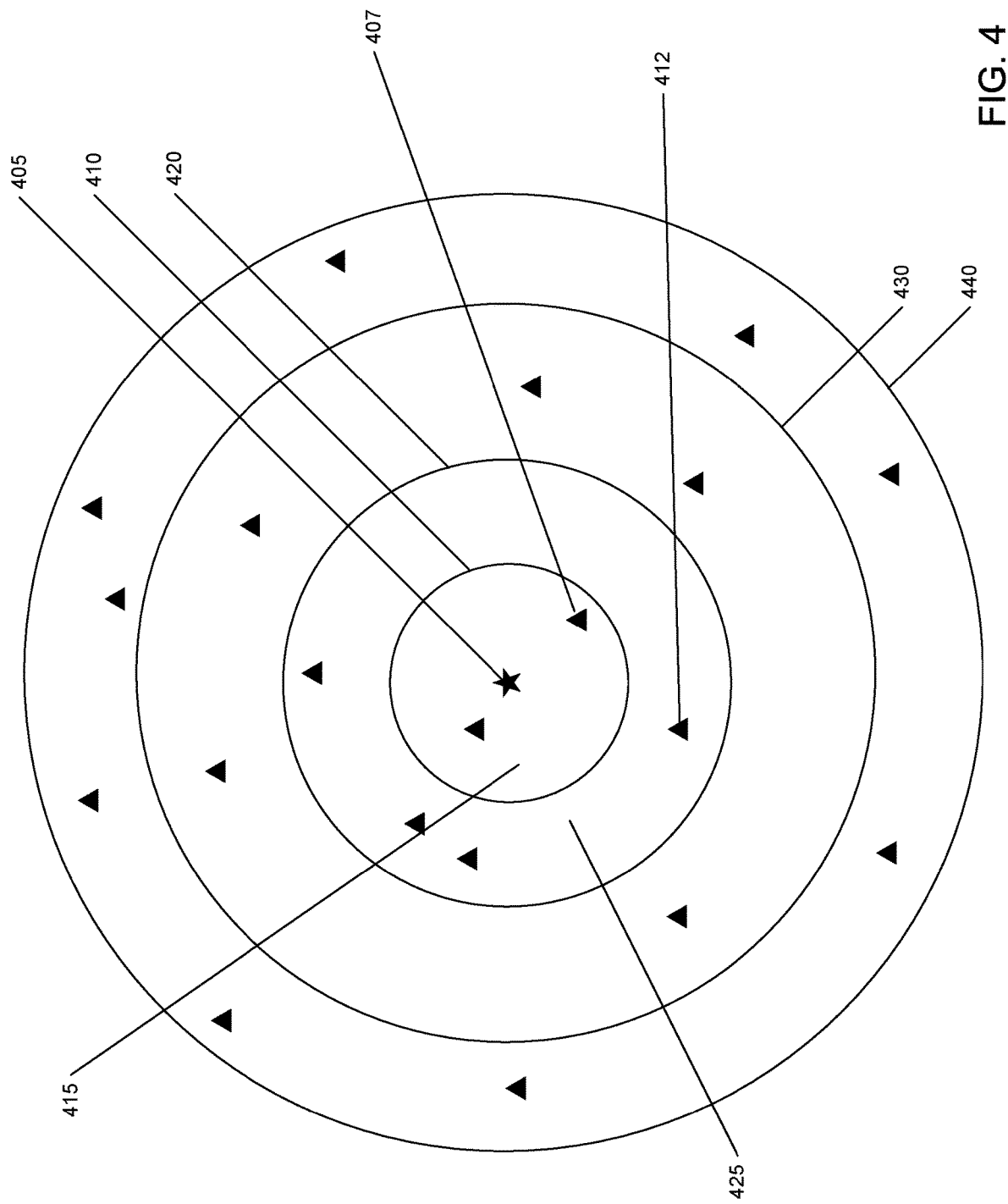
FIG. 4 is an example of selecting location data for presentation to a social networking system user, in accordance with an embodiment of the invention.

FIG. 4 shows an example of a process for selecting candidate locations by applying one or more rules. In the example of FIG. 4, the location query engine 325 generates groups of candidate locations based on the distance between a candidate location and a location associated with a user 405. In one example, the location associated with the user 405 is a hometown or current location specified in the user's user profile. As another example, the location associated with the user 405 is a location where the user most recently checked-in using a client device 110 or most recently communicated to the social networking system 140.

In the example of FIG. 4, the location query engine 325 specifies multiple radii 410, 420, 430, 440 corresponding to distances from the location associated with the user 405 and uses the radii 410, 420, 430, 440 to group candidate locations. For example, a first group 415 includes candidate locations having a distance from the location associated with the user 405 that does not exceed a first radius 410. Similarly, a second group 425 includes candidate locations having a distance from the location associated with the user 405 greater than the first radius 410 but not exceeding a second radius 420.

As described above, the location query engine 235 may apply different rules when selecting a subset of candidate locations so that the subset includes candidate locations from different groups. One or more social signals, such as data from the user's user profile may be used to rank the candidate locations within each group, with one or more candidate locations selected from different groups. In the example of FIG. 4, a rule specifies selection of at least one candidate location from the first group 415 and from the second group 425, so the subset selected by the location query engine 235 includes the first candidate location 407 and the second candidate location 412. By applying one or more rules, the location query engine 235 may force the subset to include different groups, even if ranking the candidate locations in their entirety would result in the subset including candidate locations included within a single group.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method for improving candidate location tags in an application, comprising:
    receiving, from a user of a social networking system, a content item to be posted on the social networking system by the user;
    receiving, at the social networking system from the user, a location query for a location with which the user is able to tag the content item as being related to the location so that a location tag is included in a post of the content item by the user, the location query having one or more attributes;
    to determine the candidate location tags from which the user selects at the application:
        accessing user profile data associated with the user in the social networking system, the user profile data describing characteristics of the user and other users of the social networking system connected to the user,
        accessing location data stored by the social networking system, the location data identifying a plurality of locations but not identifying a current location of the user, at least some of the plurality of locations having one or more attributes that are associated with historical user actions stored in the user profile data, the historical user actions unrelated to the current location of the user,
        selecting candidate locations from the plurality of locations, the candidate locations selected without considering the current location of the user, the selecting comprising matching the one or more attributes of the location query with the one or more attributes of the plurality of locations associated with the historical user actions that are unrelated to the current location of the user,
        ranking the selected candidate locations based on the user profile data, and
        selecting a subset of the selected candidate locations for presentation to the user as the candidate location tags based on the ranking; and
    presenting the candidate location tags as selectable elements at the application for the user to select, at the application, the location with which to tag the content item to include the location in the post with the content item.

2. The method of claim 1, wherein an attribute of the location query and an attribute of the plurality of locations comprise a name.

3. The method of claim 2, wherein selecting candidate locations from the plurality of locations comprises:
    comparing the name of the location query with portions of names associated with plurality of locations; and
    selecting a location associated with a name having at least a subset of the name matching the name of the location query.

4. The method of claim 1, wherein to determine the candidate location tags from which the user selects at the application further comprises:
    determining, from the user profile data, a location associated with the user;
    determining a set of distances from the location associated with the user;
    associating a group with each in the set of distances from the location associated with the user;
    determining a distance between each candidate location and the location associated with the user;
    including a candidate location in a group based on a distance between the candidate location and the location associated with the user; and
    selecting a plurality of candidate locations, the plurality of candidate locations including locations associated with a plurality of groups.

5. The method of claim 4, wherein the set of distances comprises at least a first radius corresponding to a first group and a second radius corresponding to a second group, the second radius being larger than the first radius, and wherein including a candidate location in a group based on a distance between the candidate location and the location associated with the user comprises:
    including the candidate location in the first group if the distance between the candidate location and the location associated with the user does not exceed the first radius; and
    including the candidate location in the second group if the distance between the candidate location and the location associated with the user is greater than the first radius but does not exceed the second radius.

6. The method of claim 1, wherein selecting the subset of the selected candidate locations comprises:
    determining a type associated with a plurality of the candidate locations; and
    selecting candidate locations so that at least two different candidate locations in the subset are associated with different types.

7. The method of claim 6, wherein each of the different candidate locations is selected from a group consisting of: a check-in associated with the user, a historical location associated with the user, and a location geographically near a location associated with the user and a business.

8. The method of claim 1, wherein ranking the selected candidate locations based on the user profile data comprises:
determining, from the user profile data, a location associated with the user;
determining a distance between each of the selected candidate locations and the location associated with the user; and
ranking the selected candidate locations based on the distances.

9. The method of claim 8, wherein the location associated with the user comprises at least one of a group consisting of: a hometown of the user, a historical location associated with the user, and a check-in location of the user.

10. The method of claim 1, wherein ranking the selected candidate locations based on the user profile data comprises:
comparing information associated with each of the selected candidate locations with the user profile data; and
ranking the selected candidate locations based on the comparison.

11. The method of claim 1, wherein ranking the selected candidate locations based on the user profile data comprises:
identifying, from the user profile data, other users connected to the user;
determining locations associated with the users connected to the user;
comparing each of the selected candidate locations to the locations associated with the users connected to the user; and
ranking the selected candidate locations based on the comparison.

12. The method of claim 1, wherein ranking the selected candidate locations based on the user profile data comprises:
identifying, from the user profile data, objects maintained by the social networking system that are connected to the user;
determining locations associated with the identified objects;
comparing each of the selected candidate locations to the locations associated with the identified objects; and
ranking the selected candidate locations based on the comparison.

13. The method of claim 1, wherein ranking the selected candidate locations based on the user profile data comprises:
identifying, from the user profile data, one or more of: at least one location previously associated with the user, at least one location associated with content in which the user is tagged and at least one location associated with an object in the social networking system in which the user expressed an interest;
comparing each of the selected candidate locations to the identified locations; and
ranking the selected candidate locations based on the comparison.

14. The method of claim 1, wherein ranking the selected candidate locations based on the user profile data comprises:
determining, from the user profile data, a frequency of interaction between the user and each of the selected candidate locations; and
ranking the selected candidate locations based on the frequencies of interaction.

15. The method of claim 1, wherein ranking the selected candidate locations based on the user profile data comprise:
identifying, from the user profile data, other users connected to the user;
determining a frequency of interaction between the users connected to the user and each of the selected candidate locations;
determining, from the user profile data, a frequency of interaction between the user and each of the selected candidate locations; and
ranking the selected candidate locations based on the frequencies of interaction between the users connected to the user and each of the selected candidate locations and based on the frequencies of interaction between the user and each of the selected candidate locations.

16. The method of claim 1, further comprising:
receiving from the user a selection of one of the candidate location tags; and
receiving from the user an indication to associate one of the candidate location tags selected by the user with content being posted by the user within the social networking system.

17. A system comprising:
a processor; and
a non-transitory computer readable medium storing instructions that, when executed by the processor, cause the processor to at least:
receive, from a user of a social networking system, a content item to be posted on the social networking system by the user;
receive, at the social networking system from the user, a location query for a location with which the user is able to tag the content item as being related to the location so that a location tag is included in a post of the content item by the user, the location query having one or more attributes;
to determine the candidate location tags from which the user selects at the application:
access user profile data associated with the user in the social networking system, the user profile data describing characteristics of the user and other users of the social networking system connected to the user,
access location data stored by the social networking system, the location data identifying a plurality of locations but not identifying a current location of the user, at least some of the plurality of locations having one or more attributes that are associated with historical user actions stored in the user profile data, the historical user actions unrelated to the current location of the user,
select candidate locations from the plurality of locations, the candidate locations selected without considering the current location of the user, the selecting comprising matching the one or more attributes of the location query with the one or more attributes of the plurality of locations associated with the historical user actions that are unrelated to the current location of the user,
rank the selected candidate locations based on the user profile data, and
select a subset of the selected candidate locations for presentation to the user as the candidate location tags based on the ranking; and
present the candidate location tags as selectable elements at the application for the user to select, at the application, the location with which to tag the content item to include the location in the post with the content item.

18. The system of claim 17, wherein an attribute of the location query and an attribute of the plurality of locations comprise a name.

19. The system of claim 18, wherein the instructions to select candidate locations from the plurality of locations comprise instructions to:
- compare the name of the location query with portions of names associated with the plurality of locations; and
- select a location associated with a name having at least a subset of the name matching the name of the location query.

20. The system of claim 17, wherein the instructions that cause the processor to rank the selected candidate locations based on the user profile data comprise instructions to:
- identify, from the user profile data, other users connected to the user;
- determine locations associated with the users connected to the user;
- compare each of the selected candidate locations to the locations associated with the users connected to the user; and
- rank the selected candidate locations based on the comparison.

21. The system of claim 17, wherein the instructions that cause the processor to rank the selected candidate locations based on the user profile data comprise instructions to:
- identify, from the user profile data, objects maintained by the social networking system that are connected to the user;
- determine locations associated with the identified objects;
- compare each of the selected candidate locations to the locations associated with the identified objects; and
- rank the selected candidate locations based on the comparison.

\* \* \* \* \*